Sept. 22, 1936.　　　　C. A. RALL　　　　2,055,049
ELECTRIC MOTOR
Filed July 24, 1933

Witnesses
Arthur M. Framke
Fred M. Davis

Inventor
Carl A. Rall.
By Rummler, Rummler & Woodworth
Attys.

Patented Sept. 22, 1936

2,055,049

UNITED STATES PATENT OFFICE 2,055,049

ELECTRIC MOTOR

Carl A. Rall, Chicago, Ill., assignor to Bodine Electric Company, Chicago, Ill., a corporation of Illinois Application July 24, 1933, Serial No. 681,924

3 Claims. (Cl. 172—278)

This invention relates to new and useful improvements in dynamo-electric machinery and more particularly to self starting single phase motors, mainly and especially those of the induction type.

Heretofore and up to the present time, in order to give some degree of rotary effect to the field and so provide starting torque for such motors, it has been customary to use split-phase starter windings in the case of the larger motors, where a strong starting torque is required; and in the case of smaller motors shading coils have been used.

The main objects of the present invention are to provide a simpler and better method of obtaining starting torque for single phase induction motors; to provide for increasing the starting torque of such motors of all capacities, and without materially increasing their weight or size and without increasing the cost; to provide a more economical method and means for starting this kind of motor of very small size; to provide a novel and improved form and make-up of field member adapted to enable accomplishment of the foregoing purposes; to provide for this through the use of multiple flux paths of unlike reluctances; and to provide especially for applying this invention to induction motors, though not limited thereto.

Whenever the constantly varying flux created by an alternating current penetrates iron masses or becomes linked with electro-conductive material, power is expended and watt losses mainly in the form of heat are bound to occur. These losses are generally known as iron losses and as secondary or eddy-current losses. High reluctance paths favor small magnetic lag, and low reluctance favors greater lag.

I now refer to the accompanying drawing.

Figure 1:
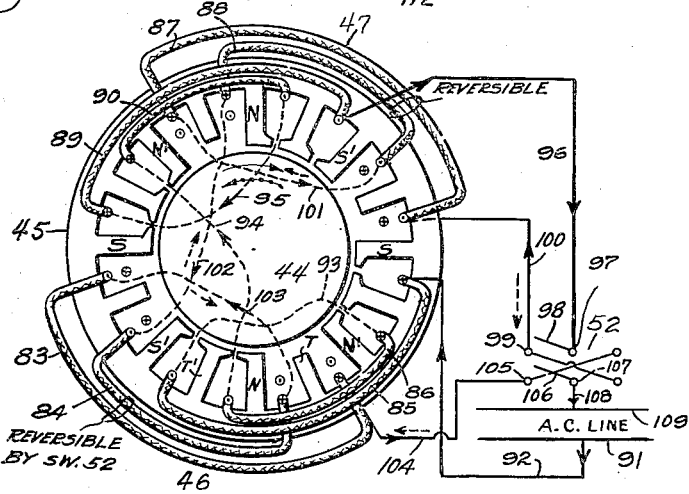
Fig. 1 illustrates a four pole, reversible reluctance start motor having a stator of the distributed winding type.

The reversible motor of Fig. 1 has a rotor 44 and a yoke 45 slotted to receive windings 46 and 47. The switch 52 serves to reverse the motor.

It is to be noted that on Fig. 1 windings 46 include a set of two concentric coils 83 and 84 and two other such coils 85 and 86 disposed 45° therefrom; and that windings 47, being 180° from windings 46, similarly include a set of two concentric coils 87 and 88 and two other such coils 89 and 90, disposed 45° therefrom; coils 83 and 84 being 180° from coils 87 and 88, and coils 85 and 86 being 180° from coils 89 and 90.

The said coils are all in slots and the teeth embraced by the coils are of different heights, so that the magnetic reluctance differs accordingly. When the coils are connected conjunctively the flux change surges in one direction rotatively, and when the coils are connected differentially the flux change surge is in the opposite direction rotatively, as indicated on the rotor 44 of Fig. 1 by the full and dotted arrows respectively, by reason of which the motor is reversible, as will be explained more in detail.

The said coils 83 and 90 inclusive are interconnected as indicated by dotted lines. When the switch 52 is closed to the left for clockwise rotation, as shown in Fig. 1, the circuit extends from line conductor 91 to and over lead 92, and for a moment in the alternating voltage cycle the current may be said to have instantaneous flow in that direction. Thence the circuit extends to and through coil 85, the said instantaneous flow here assumed being indicated by the conventional circles with dots and crosses showing current approach and retreat respectively, as will be understood. From coil 85 the circuit goes by lead 93 to coil 86, and thence by lead 94 to coil 90, thence by lead 95 to coil 89, thence by lead 96 to the upper middle contact or hinge post 97 of switch 52, thence by blade 98, assumed to be closed to the left, to switch contact 99, thence by lead 100 to coil 87, thence by lead 101 to coil 88, thence by lead 102 to coil 84, thence by lead 103 to coil 83, thence by lead 104 to switch contact 105, thence by blade 106 to the lower hinge post 107, thence by lead 108 to the other line conductor 109, as indicated by full arrows.

The result is that coils 85 and 86, energized as at the certain instant referred to, tend to cause a north pole at the right side of the lower tooth marked N, and coils 83 and 84 tend to cause a north pole on the left side. The joint effect is a very strong joint north pole at N. But the polar tooth T at the right is shorter than the polar tooth T' at the left; wherefore, the pole N builds up quickly but weakly on the right and slowly and strongly on the left, and it weakens and disappears quickly on the right end, slowly on the left. This in magnetic effect is a leftward movement of the flux on the lower side of Fig. 1. The same is true of the north pole N at the top, except that the movement is toward the right, and so this makes for clockwise field rotation, as indicated by the plain arcuate arrow on the rotor 44. It is to be understood that corresponding consequent south poles S of corresponding period are produced midway between the said north poles, at the right and left on Fig. 1. Here the short tooth on one side and the long tooth on the other side of each main south pole tooth also makes for flux rotation, in harmony with the said north polar effects. In the next half cycle the current and polarity reverse, but the direction of field rotation stays the same, owing to the fixed relation of the various polar teeth and the exciting coils.

When the switch 52 is closed to the right, for reversing the motor, the current at a given moment, corresponding with that before referred to, flows from line conductor 91 through the motor and back to the other conductor 109, just as above described, except that said switch causes reverse flow through coils 87, 88, 83 and 84, as indicated by the dotted arrows.

From switch post 97 to post 107 this reverse flow may be traced over blade 98, now swung to the right, lead 104, coil 83, lead 103, coil 84, lead 102, coil 88, lead 101, coil 87, lead 100, post 99 and blade 106 to post 107.

At this moment the coils 85, 86, 89 and 90 serve to produce north poles as before, but the reversed coils now serve to produce south poles in such manner and place as to push the north poles over somewhat in a counterclockwise direction. As a result of this the effective center of each north pole is moved from the corresponding tooth marked N to the tooth marked N' where, as viewed in Fig. 1, the lower north pole, due to the short tooth at the left and the long teeth at the right, will build up quickly but weakly at the left and slowly but strongly at the right, and this makes for reversal in rotation, of the field flux and the motor, to the counterclockwise direction. The polar shift here referred to also results in south poles at teeth S'—S' where, as may be noted, the adjacent short and long south pole teeth are so disposed as to assist in the said counterclockwise rotation of field flux.

Figure 2:
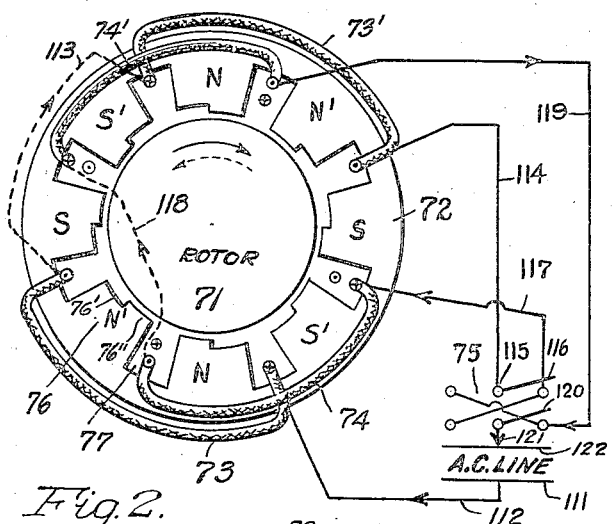
Fig. 2 illustrates a four pole reversible reluctance start motor having a stator provided with distributed windings which may be form wound coils, all of which are energized for either direction of rotation.

In Figure 2 the motor includes a rotor 71, a stator yoke ring 72, field coils 73 and 74 on one side, and coils 73' and 74' on the other side, and a reversing switch 75. Here in Fig. 2 the general plan is similar to that of Fig. 1, but somewhat simplified, there being fewer coils and the tooth and slot feature being also much simpler, and there being eight slots and eight teeth. Here each tooth or polar part 76 has a stepped face to vary the reluctance, being low on one side 76' and high on the other side 76''. When the coils are connected for combined effect the field, as it varies, rotates in one direction and when the coils are connected for opposing effect the field rotation is reversed, as will be explained. The slots 77 are here shown of the open type to accommodate form wound coils.

The said coils 73, 74, 73' and 74' are interconnected as indicated by dotted lines, and directions are indicated by arrows, as in Fig. 1.

When the switch 75 is closed to the right, as shown, the current at a given instant flows from line conductor 111 over lead 112 to coil 73, thence by lead 113 to coil 73', thence by lead 114 to hinge post 115 of switch 75, through the upper blade 116 to lead 117, thence to coil 74, thence by lead 118 to coil 74', thence by lead 119 to the lower switch blade 120 and thence by lead 121 to the other conductor 122 of the line.

The current in flowing thus induces strong instantaneous north poles on the two opposite teeth marked N and corresponding consequent south poles at the teeth marked S. It is to be noted that the stepped feature of the teeth alternates, and that the said teeth N, N and S, S are all stepped in the same direction; that is to say in the clockwise direction for inward height toward the rotor. Now, as the flux builds up quickly and weakly on the short side 76' and quickly and strongly on the tall side 76'', the magnetic result is clockwise swing or rotation of the field flux, which causes the rotor to rotate accordingly, as indicated by the full curved arrow.

When switch 75 is swung over to the left, reversal of current is effected in the coils 74 and 74', as indicated by the isolated dot and cross marked circles in corresponding stator slots. This flow of current instantaneously results in coils 73 and 73' tending to build up poles at the slots lying axially of said coils; and likewise coils 74 and 74', carrying reversed current, tend to build up south poles at slots lying axially of said coils. But mutual reaction tending to equalize spacing of the poles results in north poles being induced actually at teeth N' and N' and south poles at teeth S' and S'. Now the sequential stepping of the effective poles is reversed to counterclockwise, with resultant reversal of flux rotation and so also reversal of the motor.

It is to be understood that some of the details set forth may be altered or omitted without departing from the spirit of the invention as defined by the following claims:

I claim:

1. A reluctance start motor having field windings arranged in two sets, one set being reversible to control the direction of field flux rotation, the windings for each pole being distributed and arranged to overlap mutually.

2. In a reluctance start motor, a slotted field ring having exciter windings distributed in its slots to produce poles, said windings for each pole comprising two over-lapping diverse inductance sets of coils distributed with the polar axis of one set displaced somewhat circumferentially from the axis of its mate to produce rotary field movement, and switching means arranged and connected to render one set reversible electrically with respect to the other whereby the motor is reversible.

3. In a slotted field ring member of a reluctance start motor, a long-toothed part and a short-toothed part disposed adjacently to serve as a polar element, in combination with a highly inductive slot-winding disposed to excite the said long-toothed part, and a lowly inductive slot-winding disposed to excite said short-toothed part, said windings being mutually offset axially but somewhat overlapping each other, and means to reverse the relative connection of said windings, for reversal of the motor.

CARL A. RALL.